May 18, 1965  N. E. LYON  3,183,716
FLUID LEVEL INDICATOR
Filed Nov. 13, 1962
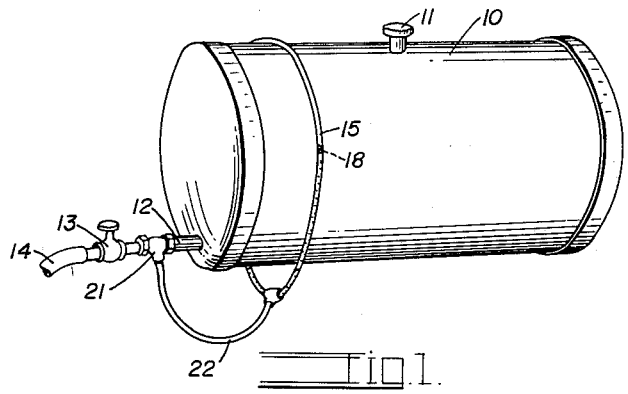
Fig. 1.
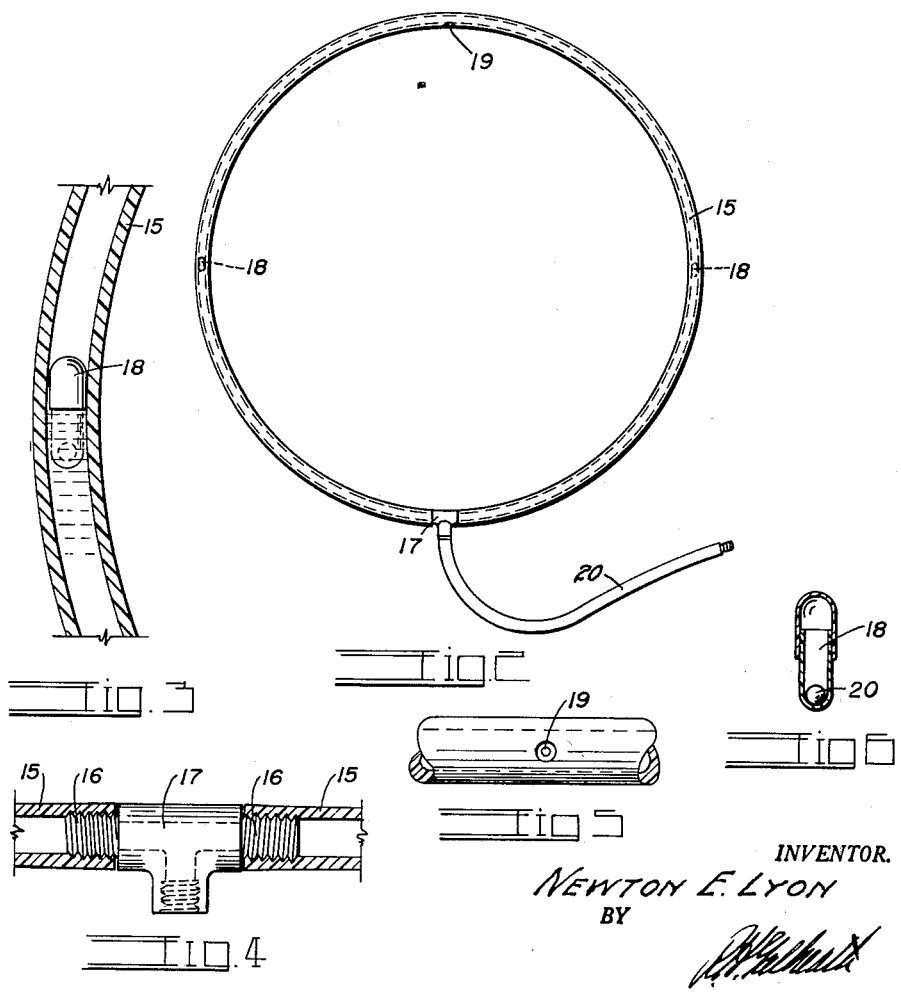
Fig. 3.  Fig. 2.  Fig. 6.
Fig. 4.  Fig. 5.
INVENTOR.
*Newton E. Lyon*
BY
ATTORNEY 3,183,716
FLUID LEVEL INDICATOR
Newton E. Lyon, Strasburg, Colo., assignor to Lyon Useful Device Company, Strasburg, Colo., a corporation of Colorado
Filed Nov. 13, 1962, Ser. No. 237,227
1 Claim. (Cl. 73—323)

This invention relates to a fluid level indicator for tanks and while more particularly designed for use on the type of elevated, horizontal, cylindrical tanks as used on farms and construction jobs for containing fuel oil for filling the fuel tanks of tractors and the like, it will be found useful on any type of tank where it is desired to indicate the level of fluid in the tank.

The principal object of the invention is to provide a simple, economical and highly efficient fluid level indicator which can be quickly and easily applied to present tank installations without disturbing the tank installation in any way and which will not require any drilling or tapping or other tool work on the tank.

Another object is to provide a fluid level indicator which can be simply placed over a present tank without any attachment to the tank, per se, and which will be retained in place by gravity to give an accurate visible indication of the fluid level in the tank.

A further object is to provide a device of this character which can be quickly cut to fit a tank of any given diameter without affecting the accuracy of its level indicating function.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a perspective view of a conventional fuel tank of the type usually used for gravity filling of tractor tanks showing the invention in place thereon;

FIG. 2 illustrates the improved fluid level indicator as it would appear before being placed on a tank;

FIG. 3 is an enlarged longitudinal detail section of the portion of the device indicated by the bracket "3" in FIG. 2;

FIG. 4 is a similar longitudinal detail section of the portion of the device indicated by the bracket "4" in FIG. 2;

FIG. 5 is a similarly enlarged fragmentary, detail view looking in the direction of the arrow "5" in FIG. 2; and FIG. 6 is a still further enlarged detail longitudinal section through a capsule float employed in the device.

In FIG. 1, a conventional fuel tank is indicated at 10 with its filling neck at 11, discharge nipple at 12, discharge valve at 13 and vehicle filling hose at 14. In the usual installation, the tank 10 is elevated so that the fuel oil will flow by gravity through the hose 14 controlled by a conventional filling station nozzle on the extremity of the hose. The showing of the tank is simply illustrative of the purpose of the invention. The tank could be a fluid container of any size or shape.

The invention comprises a length of flexible, transparent plastic tubing 15 having a length slightly in excess of the circumference of the given tank. The tubing is formed into closed loop with its extremities forced over or threaded onto nipples 16 which project oppositely outward from a T-fitting 17.

Two hollow, capsule-like floats 18 are placed in the tubing 15 before assembly and an air bleed hole 19 is formed in the tubing intermediate its length. The floats are hermetically sealed and it is preferred to place a shot weight 20 therein so that they will float in an upright position.

To install, the tubing loop is simply placed on the tank as shown in FIG. 1 with the T-fitting 17 at the bottom and the air hole 19 at the top of the tank. The T-fitting 17 is then connected to the discharge nipple 12 in any suitable manner.

As illustrated, a conventional pipe T 21 is positioned in the discharge line between the valve 13 and the discharge nipple 12. The side outlet of the pipe T 21 is connected by means of a flexible tubing 22 with the side outlet of the T-fitting 17. If preferred, the pipe T 21 may be placed in the discharge line between the valve 13 and the hose 14 if the extremity of the latter is normally closed by the conventional filling station nozzle.

It can be seen that the transparent plastic tubing 15 will fill with fluid up to the level of the fluid in the tank and the fluid level in the tank can be instantly observed by glancing at either of the floats 18. The latter are preferably colored so as to be easily visible.

It is preferred to market the improved fluid level indicator as a kit containing a length of ⅜" plastic tubing, two capsule floats, and two T-fittings.

The user simply places the tubing circumferentially around the tank and cuts it to length. It need not fit tightly about the tank but may hang loosely therebelow. A capsule float is then inserted in each tube extremity and the latter are forced over the nipples 16 of the T-fitting 17. A second length of tubing is then cut to form the connecting tubing 22 and the latter is installed between the T-fittings 17 and 21 illustrated. The air bleed hole 19 is then formed at the top of the tubing loop and the device is ready for use.

While a specific form of the invention has been described and illustrated herein, it is to be understood that the same may be varied within the scope of the appended claim, without departing from the spirit of the invention.

Having thus described the invention what is claimed and desired to be secured by Letters Patent is:

A fluid level indicator for horizontally-positioned cylindrical tanks, of the type provided with a discharge pipe to discharge fluid from a low level at one extremity of said tank, comprising: a length of transparent plastic tubing having a length in excess of the circumference of said tank; a T-fitting connecting the extremities of said tubing into a closed loop adapted to loosely surround and be supported by said tank in a vertical plane; a movable float positioned in said tubing at each side of said tank; an air bleed hole formed in said tubing intermediate its extremities; a flexible tubing having one extremity connected to said T-fitting; and means for coupling the other extremity of said flexible tubing to the discharge conduit of said tank.

References Cited by the Examiner
UNITED STATES PATENTS

| 378,812 | 2/88 | Tyler | 222—159 |
|---|---|---|---|
| 1,150,122 | 8/15 | Jeavons | 73—323 X |
| 1,218,525 | 3/17 | Cole | 73—323 |
| 2,693,703 | 11/54 | Rawson | 73—334 |

FOREIGN PATENTS

| 879 | 1897 | Great Britain. |
|---|---|---|

ISAAC LISANN, *Primary Examiner.*